(12) United States Patent
Briglia et al.

(10) Patent No.: US 10,317,135 B2
(45) Date of Patent: Jun. 11, 2019

(54) SEPARATION AT SUB-AMBIENT TEMPERATURE OF A GASEOUS MIXTURE CONTAINING CARBON DIOXIDE AND A LIGHTER CONTAMINANT

(71) Applicant: L'Air Liquide, Societe Anonyme pour l'Etude et l'Exploitation des Procedes Georges Claude, Paris (FR)

(72) Inventors: Alain Briglia, Hangzhou (CN); Mathieu Leclerc, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 952 days.

(21) Appl. No.: 14/768,981

(22) PCT Filed: Feb. 20, 2014

(86) PCT No.: PCT/FR2014/050351
§ 371 (c)(1),
(2) Date: Aug. 19, 2015

(87) PCT Pub. No.: WO2014/128409
PCT Pub. Date: Aug. 28, 2014

(65) Prior Publication Data
US 2016/0003533 A1 Jan. 7, 2016

(30) Foreign Application Priority Data
Feb. 21, 2013 (FR) ...................................... 13 51483

(51) Int. Cl.
*F25J 3/02* (2006.01)
*F25J 3/06* (2006.01)

(52) U.S. Cl.
CPC ........... *F25J 3/0266* (2013.01); *F25J 3/0209* (2013.01); *F25J 3/0223* (2013.01); *F25J 3/0252* (2013.01);
(Continued)

(58) Field of Classification Search
CPC ............. F25J 3/066; F25J 3/067; C01B 3/506
See application file for complete search history.

(56) References Cited

U.S. PATENT DOCUMENTS

2012/0137728 A1   6/2012  Zanganeh et al.

FOREIGN PATENT DOCUMENTS

EP          2 023 066       2/2009
WO   WO 2012 0 038 637      3/2012

OTHER PUBLICATIONS

International Search Report and Written Opinion for PCT/FR2014/050351, dated Jul. 25, 2014.
(Continued)

*Primary Examiner* — John F Pettitt, III
(74) *Attorney, Agent, or Firm* — Justin K. Murray

(57) ABSTRACT

A device for separating a gas mixture containing at least 35 mol % carbon dioxide and also at least one gas lighter than carbon dioxide, comprising a first phase separator configured to receive a first partially condensed flow from an exchange line; a first phase separator configured to separate the gas phase from the liquid phase; a cooling means configured to receive the gas phase from the first phase separator and cool said gas phase to form a second partially condensed flow. The resulting liquid phase is then sent to a first valve and is expanded to a lower pressure that is at most 300 mbar lower in order to form a first expanded liquid, which is then mixed with a second liquid originating from the second phase separator in a mixing means that is located upstream of a third valve.

10 Claims, 2 Drawing Sheets

(52) U.S. Cl.
CPC ............... *F25J 3/061* (2013.01); *F25J 3/067* (2013.01); *F25J 3/0625* (2013.01); *F25J 3/0655* (2013.01); *F25J 2200/02* (2013.01); *F25J 2200/40* (2013.01); *F25J 2200/70* (2013.01); *F25J 2205/04* (2013.01); *F25J 2205/66* (2013.01); *F25J 2210/70* (2013.01); *F25J 2215/04* (2013.01); *F25J 2220/82* (2013.01); *F25J 2230/30* (2013.01); *F25J 2230/32* (2013.01); *F25J 2230/80* (2013.01); *F25J 2235/80* (2013.01); *F25J 2240/90* (2013.01); *F25J 2245/02* (2013.01); *F25J 2270/02* (2013.01); *F25J 2270/04* (2013.01); *Y02C 10/12* (2013.01)

(56) References Cited

OTHER PUBLICATIONS

French Search Report and Written Opinion for FR 1 351 483, dated Feb. 17, 2014.

SEPARATION AT SUB-AMBIENT TEMPERATURE OF A GASEOUS MIXTURE CONTAINING CARBON DIOXIDE AND A LIGHTER CONTAMINANT

CROSS REFERENCE TO RELATED APPLICATIONS

This application is a § 371 of International PCT Application PCT/FR2014/050351, filed Feb. 20, 2014, which claims the benefit of FR1351483, filed Feb. 21, 2013, both of which are herein incorporated by reference in their entireties.

TECHNICAL FIELD OF THE INVENTION

The present invention relates to the separation at sub-ambient temperature of a gas mixture containing carbon dioxide and a lighter gas. In particular, it comprises a process and a device for separating a gas mixture containing at least 35 mol % carbon dioxide and at least one lighter gas. The lighter gas(es) may be selected from the following list: carbon monoxide, hydrogen, methane, oxygen, nitrogen, argon.

SUMMARY OF THE INVENTION

The gas mixture may comprise at least 45 mol % carbon dioxide or at least 55 mol % carbon dioxide or at least 65 mol % carbon dioxide or at least 75 mol % carbon dioxide.

The aim of the separation is to produce a fluid richer in carbon dioxide than the mixture separated. This fluid may be a gas at ambient pressure, a gas at higher pressure than ambient pressure, or a pressurized liquid. The gas may be produced by vaporization of a liquid.

Examples of mixtures that may be separated by the process according to various embodiments of the invention are:
 the residual gas from an adsorption process producing a hydrogen-rich flow and a residual gas containing at least 35 mol % carbon dioxide, and also at least hydrogen;
 the residual gas from an oxy-fuel combustion process in which a fuel is burnt in the presence of oxygen in order to produce a residual gas containing at least 55 mol % carbon dioxide and also at least oxygen and nitrogen.

A unit for separating carbon dioxide at sub-ambient temperature comprises a sub-ambient temperature step (sometimes referred to as a cryogenic step) in which the pressurized and dried mixture is separated from at least one other gas.

The sub-ambient step essentially comprises at least one cooling step and one partial condensation step. Specifically, the gas that is treated in the sub-ambient temperature step must be cooled down to temperatures close to the triple point of carbon dioxide, in the region of −56° C. At these temperatures, the gas will be partially condensed, the liquid being particularly enriched in carbon dioxide. It is then necessary to separate the liquid from the gas using a separation pot. This liquid, originating from the separation pot, is often expanded then sent to a distillation column in order to be purified therein.

The chosen pressure of the column may be much lower than that of the separation pot. By way of example, within the context of capturing carbon dioxide with regard to residual gas from an SMR (steam methane reformer) $H_2$ PSA, the partial condensation pressure is chosen in the region of 50 bara, whereas the pressure of the column is in the region of 11 bara. The expansion in a valve of the liquid at equilibrium resulting from the pot will generate a partial vaporization that will result in a large drop in the temperature at the outlet of the valve. If the liquid before the valve is at a temperature close to the triple point of $CO_2$, the temperature at the outlet of the valve may turn out to be lower than that of the triple point of $CO_2$. A significant risk of freezing of the $CO_2$ contained and concentrated in the liquid is then to be feared.

The solution customarily chosen for limiting this cooling and the associated risk of freezing consists in heating the liquid resulting from the pot before expanding it. But this solution has one major drawback: since the liquid resulting from the pot is at equilibrium, the heating thereof will generate the partial vaporization thereof. A two-phase mixture will therefore enter the expansion valve. The latter will be much more difficult to control: the measurement of the physical parameter (for example pressure, flow rate) regulating the opening of the valve will be disrupted by the presence of gas, the physical properties of which are very different from the liquid; the opening or the closing of the valve which will result from this disrupted measurement will have an unpredictable effect on the properties of the fluid at the outlet of the valve. The valve could also be degraded more rapidly owing to the respective velocities of the gas and of the liquid and in particular to the two-phase flow mode at the inlet of the valve.

According to one subject of the invention, a process is provided for separating a gas mixture containing at least 35 mol % carbon dioxide, or even at least 45 mol % carbon dioxide, and also at least one gas lighter than carbon dioxide, wherein:
 i) the mixture is cooled in order to form a first partially condensed flow,
 ii) the first partially condensed flow is sent to a first phase separator,
 iii) a gas from the first phase separator, containing less carbon dioxide than the gas mixture, is cooled, without having been compressed, in order to form a second partially condensed flow,
 iv) the second partially condensed flow is sent to a second phase separator,
 v) a liquid drawn off from the first phase separator, containing more carbon dioxide than the gas mixture, is expanded, without having been heated, in a first valve to reduce its pressure by at most 300 mbar in order to form a first expanded liquid,
 vi) the first expanded liquid is mixed with a second liquid originating from the second phase separator, the second liquid not having been expanded or heated before being mixed with the first expanded liquid, in order to form a fluid consisting of at least 99.9% liquid, the temperature of the first expanded liquid being greater than the temperature of the second liquid,
 vii) the third fluid is expanded in a second valve to a pressure such that the partial pressure of the carbon dioxide in the third expanded fluid is greater than 5.28 bar abs and the temperature of the third expanded fluid is above −54.5° C., and
 viii) the third expanded fluid is sent at least in part to a chamber and/or to an indirect heat exchanger, without having been heated,
such that the second liquid from the second phase separator would reach a temperature below −54.5° C. if it had been expanded, without having been mixed with the first expanded liquid, up to the pressure of the chamber and/or of the indirect heat exchanger.

According to other optional subjects of the invention:
  at least a portion of the third expanded fluid is sent to the top of a simple distillation column in order to supply the column and be separated therein, a gas is drawn off from the top of the column and a liquid enriched in carbon dioxide with respect to the gas mixture is drawn off at the bottom of the column;
  the liquid enriched in carbon dioxide originating from the column is heated, or even is at least partially vaporized, by heat exchange with the gas from the first phase separator which is cooled of step iii), preferably in a dedicated indirect heat exchanger;
  the liquid enriched in carbon dioxide is vaporized by heat exchange with the gas mixture which is cooled of step i);
  at least a portion of the third expanded fluid is sent to a third phase separator and the gas from the third phase separator is heated and/or the liquid from the third phase separator is vaporized by heat exchange with the gas mixture of step i);
  at least a portion of the third expanded fluid is sent to an indirect heat exchanger where it is heated, or even is vaporized in order to form a gas enriched in carbon dioxide;
  the first and second phase separators and, where appropriate, the third phase separator are phase separators that carry out a separation equivalent to a single theoretical plate.

According to another subject of the invention, a device is provided for separating a gas mixture containing at least 35 mol % carbon dioxide, or even at least 45 mol % carbon dioxide, and also at least one gas lighter than carbon dioxide, comprising an exchange line, a duct for sending the mixture to be cooled into the exchange line in order to form a first partially condensed flow, a phase separator, a duct for sending the first partially condensed flow is sent from the exchange line to the first phase separator, a cooling means, a duct for sending a gas from the first phase separator, containing less carbon dioxide than the gas mixture, to be cooled by the cooling means, without having been compressed, in order to form a second partially condensed flow, a second phase separator, a duct for sending the second partially condensed flow to a second phase separator, a first valve, a duct for sending a liquid drawn off from the first phase separator, containing more carbon dioxide than the gas mixture, to be expanded, without heating means upstream of the first valve and downstream of the first phase separator, in the first valve in order to reduce its pressure by at most 300 mbar and in order to form a first expanded liquid, mixing means for mixing the first expanded liquid with a second liquid originating from the second phase separator, not comprising means for expanding or heating the second liquid upstream of the mixing means, in order to form a fluid consisting of at least 99.9% liquid, the device being arranged so that, in use, the temperature of the first expanded liquid is greater than the temperature of the second liquid, a second valve for expanding the third fluid to a pressure such that the partial pressure of the carbon dioxide in the third expanded fluid is greater than 5.28 bar abs and the temperature of the third expanded fluid is above −54.5° C., and a duct for sending the third expanded fluid from the second valve at least in part to a chamber and/or to an indirect heat exchanger, without heating means between the second valve and the chamber or indirect heat exchanger.

According to other optional features, the device comprises:
  a simple distillation column, the second valve being connected to the top of the column in order to send at least a portion of the third expanded fluid thereto in order to supply the column and be separated therein, a duct for drawing off a gas from the top of the column and a duct for drawing off a liquid enriched in carbon dioxide with respect to the gas mixture at the bottom of the column;
  means for sending the liquid enriched in carbon dioxide originating from the column to be heated, or even to be vaporized at least partially, by heat exchange with the gas from the first phase separator in the cooling means;
  a third phase separator which is the chamber, a duct for sending a portion of the third expanded fluid to the third phase separator and a duct for sending a portion of the expanded flow to be heated by heat exchange with the gas mixture originating from the first phase separator;
  a third phase separator, a duct for sending at least a portion of the third expanded fluid to the third phase separator and means for sending a liquid originating from the third phase separator to be heated by heat exchange with the gas mixture of step i);
  a third phase separator, a duct for sending at least a portion of the third expanded fluid to the third phase separator and means for sending a gas originating from the third phase separator to be heated by heat exchange with the gas mixture of step i);
  an indirect heat exchanger and a duct for sending at least a portion of the third expanded fluid to the indirect heat exchanger in order to be heated therein.

The present invention makes it possible to obtain a liquid that is hot enough at the valve inlet to avoid an excessively low temperature at the outlet of the expansion valve. It is a question of carrying out a first partial condensation at a first temperature T1 followed by a second partial condensation at a second temperature T2 close to the triple point of $CO_2$ (with T1>T2). The mixture of the liquid from the first pot with that from the second will be at an intermediate temperature between T1 and T2 and there will be no generation of vapor since the liquid resulting from the mixture will also be at equilibrium. Indeed, the composition of the mixture will be intermediate between the composition of the liquid from the first pot and that from the second pot. There will also be less energy losses within the context of the invention since the heat exchange for heating the liquid at the valve inlet takes place by direct contact.

The two partial condensation steps could be carried out in two separate exchangers or in the same exchanger if the technology thereof allows it (such as brazed aluminum exchangers, for example).

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The invention will be described in greater detail by referring to the figures, which represent processes for separating a gas mixture according to the invention.

Figure 1:
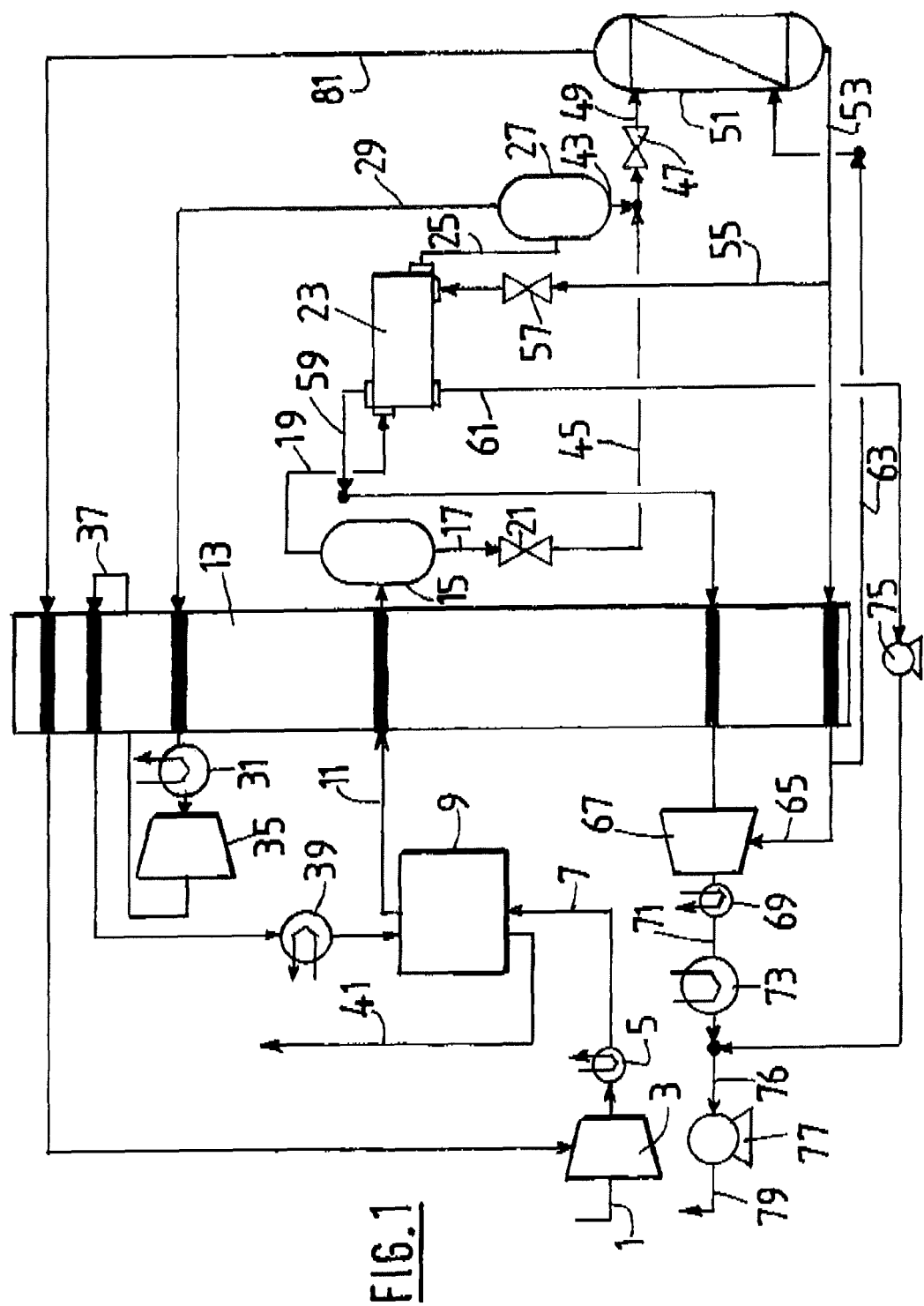
FIG. 1 represents a process flow diagram in accordance with an embodiment of the present invention.

In FIG. 1, a gas mixture 1 is compressed in a compressor 3 to a pressure of 23 bar. After cooling in a cooler 5, the cooled flow 7 is purified of water in a purification unit 9 in order to produce a dry gas mixture 11. It will be understood that these steps are optional if the mixture 1 is dry and pressurized. For this example, the flow 11 contains 87% $CO_2$, 4% oxygen, 5% nitrogen, 3.9% argon and 0.1% carbon monoxide. The gas flow 11 at ambient temperature is sent to a brazed aluminum plate heat exchanger 13 where it is cooled to −36° C. and is partially condensed. The partially condensed flow is sent to a first phase separator 15 which produces an overhead gas 19 and a bottoms liquid 17. The bottoms liquid contains 98% carbon dioxide, 0.6% oxygen, 0.7% nitrogen, 0.8% argon and a small amount of carbon monoxide. The gas 19 is enriched in light contaminants and contains only 64% carbon dioxide. The gas 19 is cooled in an exchanger 23 to a temperature of −52.5° C., close to the temperature of the triple point of carbon dioxide. Thus, the gas is partially condensed. The partially condensed flow 25 is sent to a second phase separator 27. The gas formed 29 is heated in the exchanger 13 and the heater 31 in order to be expanded in a turbine 35 from 23 bar in order to supply cold. The expanded flow 37 is reintroduced at the cold end of the exchanger 13, is heated and then is heated by the heater 39 in order to be able to regenerate the purification unit 9 in a known manner. The gas 41 that has been used for the regeneration is sent to the atmosphere.

The exchanger 23 may be a brazed aluminum plate exchanger or a shell and tube exchanger. The gas 19 undergoes therein a small pressure drop of the order of 0.2 bar.

The liquid 43 originating from the phase separator 27 contains 97% carbon dioxide and is at 22.9 bar and −52.5° C. If it is expanded to a lower pressure in order to be sent to a following step, the temperature of the liquid formed could be below the triple point, giving rise to the formation of solid particles.

In order to avoid this problem, the liquid 43 (27 700 kg/h) is mixed with the liquid 45 originating from the first phase separator. The liquid 45 is produced by expanding the bottoms liquid 17 (131 969 kg/h) from the first separator 15 in order to take into account the pressure drops in the exchanger 23. This small expansion of 0.2 bar is carried out in a valve 21. The expanded liquid 45 is at −36° C.

Thus, by mixing the liquids 43, 47, the liquid formed, referred to as third fluid, is at −39° C.

When the third fluid is expanded in the second valve 47, the flow formed is a two-phase flow at a temperature of −47° C. and at a pressure of 11 bar abs. The flow 49 is sent to the top of a stripping column 51, for which it constitutes the only feed flow. The overhead gas 81 from the column 51 is heated in the exchanger 13 and is sent to the compressor 3. The bottoms liquid 53 is split in two. One portion 55 is partially vaporized in the exchanger 23 after expansion in the valve 57. The vaporized portion 59 is heated in the exchanger 13, is compressed in a product compressor 67 and is cooled in the coolers 69, 73 up to condensation. The remaining liquid portion 61 is pressurized in a pump 75 and mixed with the flow 59 after condensation in order to form a liquid product 76 rich in carbon dioxide, containing at least 70% carbon dioxide, or even at least 90% carbon dioxide. This product 76 is pressurized in a pump 77 in order to make a pressurized product 79.

Another portion of the bottoms liquid is vaporized in the heat exchanger 13 and the gas formed is split in two. One portion 63 is sent back to the column for carrying out reboiling and the remainder 65 is sent to the compressor 65.

Figure 2:
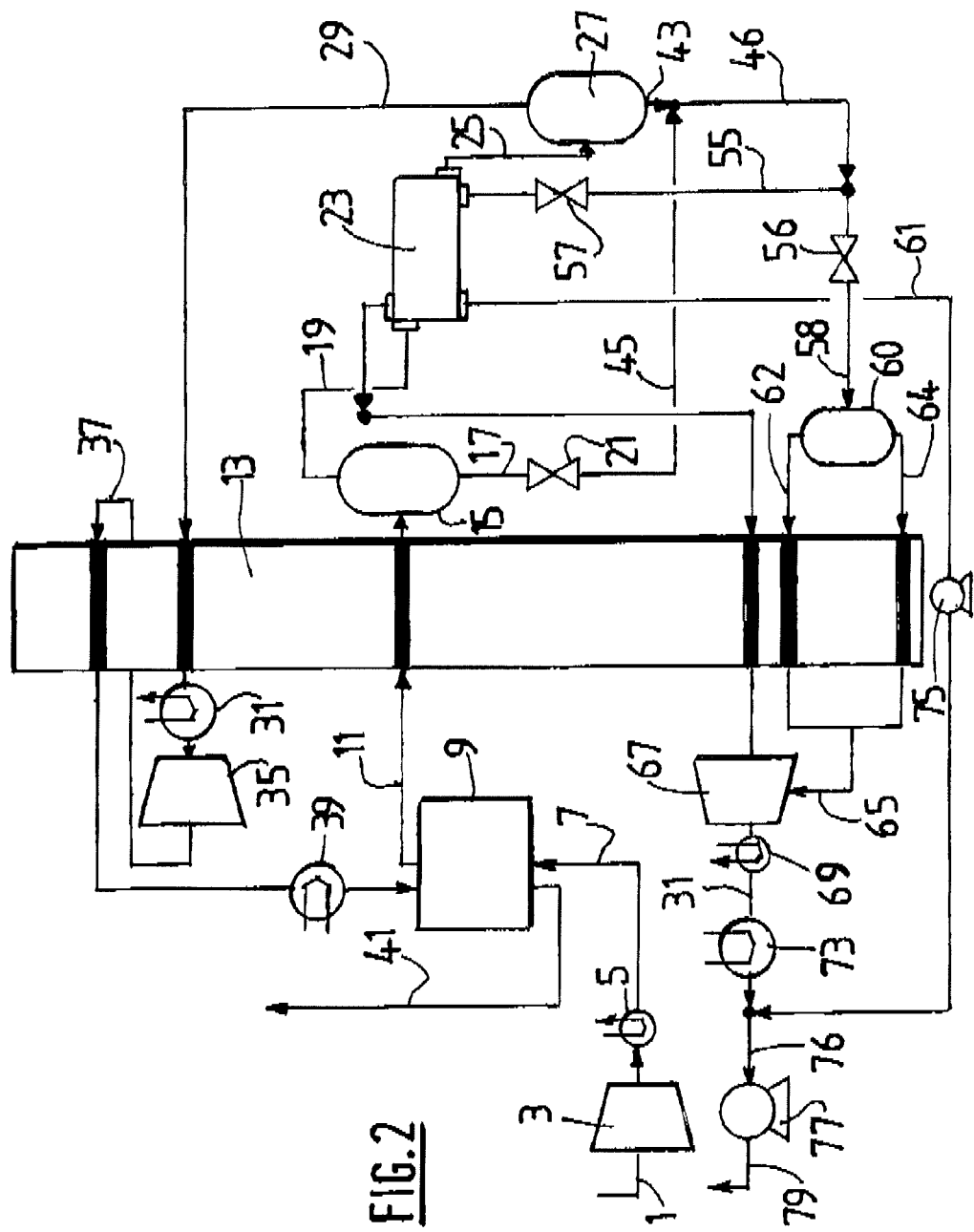
FIG. 2 represents a process flow diagram in accordance with an embodiment of the present invention.

FIG. 2 differs from FIG. 1 in that there is no distillation column 51. In this case, the two valves where there is a risk of formation of solid carbon dioxide are the valves 56, 57. The liquid 43 from the second phase separator 27 is mixed, as in FIG. 1, with the expanded liquid 45 in order to increase the temperature. The third fluid formed 46 is split in two, one portion 55 being sent to the valve 57 in order to be expanded therein and another portion being sent to the valve 56. Owing to the heating, the temperature downstream of the valves 56, 57 does not drop down to the triple point. The liquid formed in the valve 57 is partially vaporized in the exchanger 23, as for FIG. 1. The liquid 58 originating from the valve 56 is a two-phase liquid and is sent to a third phase separator 60. The gas 62 from the separator 60 is heated in the exchanger and the liquid 64 is vaporized therein. The two gases formed are mixed in order to form a flow 65 which is pressurized in the product compressor 67.

The process and the device according to invention may also be used to separate mixtures that are less rich in $CO_2$ or more rich in $CO_2$ than those of the examples.

It is possible to combine aspects of FIGS. 1 and 2, for example by sending a portion of the flow expanded in the second valve to the distillation and another portion to an indirect heat exchanger and/or to a third phase separator.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for separating a gas mixture containing at least 35 mol % carbon dioxide and also at least one gas lighter than carbon dioxide, the process comprising the steps of:
   i) cooling the mixture in order to form a first partially condensed flow;
   ii) sending the first partially condensed flow to a first phase separator;
   iii) cooling a gas from the first phase separator, containing less carbon dioxide than the gas mixture, in order to form a second partially condensed flow, wherein step iii) is done without the gas from the first phase separator having been compressed;
   iv) sending the second partially condensed flow to a second phase separator;
   v) withdrawing a liquid from the first phase separator, wherein the liquid from the first phase separator contains more carbon dioxide than the gas mixture;
   vi) expanding, without having been heated, the liquid from the first phase separator in a first valve to reduce a pressure of the liquid from the first phase separator by at most 300 mbar in order to form a first expanded liquid;
   vii) mixing the first expanded liquid with a second liquid originating from the second phase separator in order to form a third fluid consisting of at least 99.9% liquid, the second liquid not having been expanded or heated before being mixed with the first expanded liquid, a first temperature of the first expanded liquid being greater than a second temperature of the second liquid;
   viii) expanding the third fluid in a second valve to form a third expanded fluid, wherein the third expanded fluid is expanded to a pressure such that a partial pressure of the carbon dioxide in the third expanded fluid is greater than 5.28 bar abs and a third temperature of the third expanded fluid is above −54.5° C.; and
   ix) sending the third expanded fluid at least in part to a chamber and/or to an indirect heat exchanger, without having been heated prior thereto.

2. The process as claimed in claim 1, wherein at least a portion of the third expanded fluid is sent to a top of a distillation column in order to supply the distillation column and be separated therein, a gas is drawn off from the top of the distillation column and a liquid enriched in carbon dioxide with respect to the gas mixture is drawn off at a bottom of the distillation column.

3. The process as claimed in claim 2, wherein a first portion of the liquid enriched in carbon dioxide drawn off from the bottom of the distillation column is heated by heat exchange with the gas from the first phase separator.

4. The process as claimed in claim 2, wherein a second portion of the liquid enriched in carbon dioxide is vaporized by heat exchange with the gas mixture which is cooled of step i).

5. The process as claimed in claim 1, wherein at least a portion of the third expanded fluid is sent to a third phase separator and the gas from the third phase separator is heated and/or the liquid from the third phase separator is vaporized by heat exchange with the gas mixture of step i).

6. The process as claimed in claim 1, wherein at least a portion of the third expanded fluid is sent to an indirect heat exchanger where the at least the portion of the third expanded fluid is heated to form a gas enriched in carbon dioxide.

7. A device for separating a gas mixture containing at least 35 mol % carbon dioxide, or even at least 45 mol % carbon dioxide, and also at least one gas lighter than carbon dioxide, comprising:
   an exchange line;
   a first duct configured to send the mixture to be cooled into the exchange line in order to form a first partially condensed flow;
   a first phase separator;
   a second duct configured to send the first partially condensed flow from the exchange line to the first phase separator;
   a cooling means;
   a third duct configured to send a gas from the first phase separator, containing less carbon dioxide than the gas mixture, to be cooled by the cooling means, without having been compressed, in order to form a second partially condensed flow;
   a second phase separator;
   a fourth duct configured to send the second partially condensed flow second phase separator;
   a first valve;
   a fifth duct configured to send a liquid drawn off from the first phase separator, containing more carbon dioxide than the gas mixture, to be expanded, without heating means upstream of the first valve and downstream of the first phase separator, in the first valve in order to reduce its pressure by at most 300 mbar and in order to form a first expanded liquid;
   a mixing means for mixing the first expanded liquid with a second liquid originating from the second phase separator in order to form a third fluid consisting of at least 99.9% liquid;
   an absence of an expansion or heating device that is operable on the second liquid upstream of the mixing means, wherein the first phase separator is configured such that, when in use, a first temperature of the first expanded liquid is greater than a second temperature of the second liquid;
   a second valve configured to expand the third fluid to a pressure such that a partial pressure of the carbon dioxide in the third expanded fluid is greater than 5.28 bar abs and a third temperature of the third expanded fluid is above −54.5° C.; and
   a sixth duct configured to send the third expanded fluid from the second valve at least in part to a chamber and/or to an indirect heat exchanger without a heating means between the second valve and the chamber or indirect heat exchanger.

8. The device as claimed in claim 7, comprising a distillation column, the second valve being connected to a top of the distillation column in order to send at least a portion of the third expanded fluid thereto in order to supply the distillation column and be separated therein, an eighth duct for drawing off a gas from the top of the distillation column and a ninth duct for drawing off a liquid enriched in carbon dioxide with respect to the gas mixture at a bottom of the distillation column.

9. The device as claimed in claim 7, wherein the cooling means is the exchange line.

10. The device as claimed in claim 7, wherein the cooling means is a heat exchanger other than the exchange line.

\* \* \* \* \*